United States Patent Office 3,591,491
Patented July 6, 1971

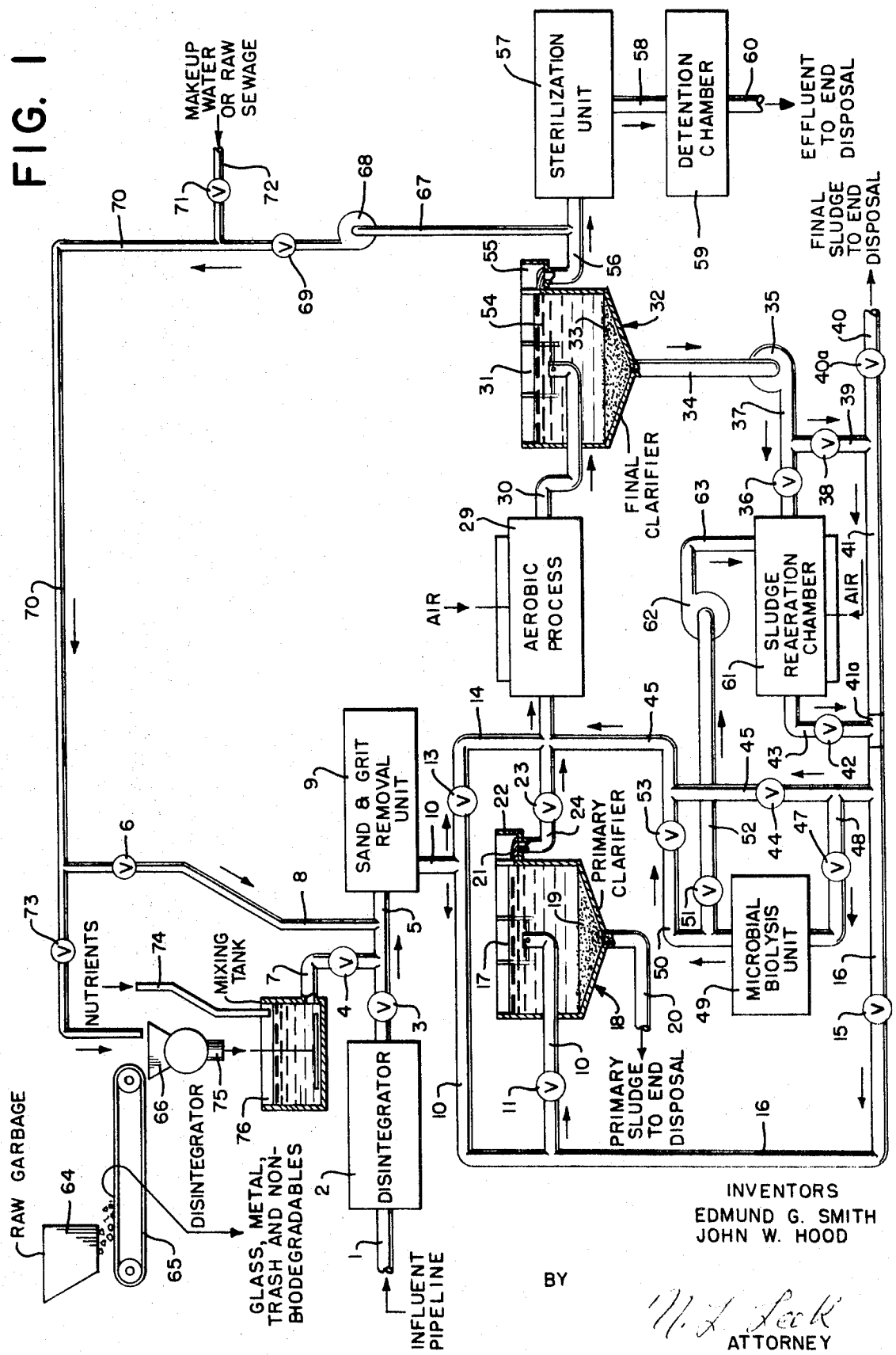

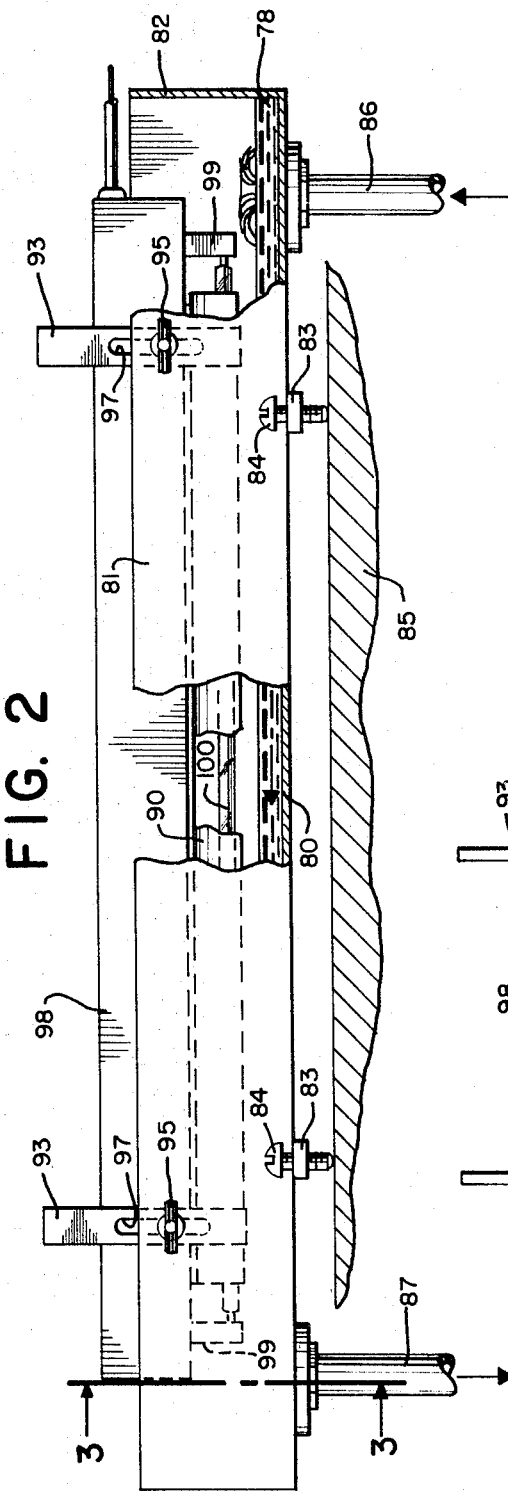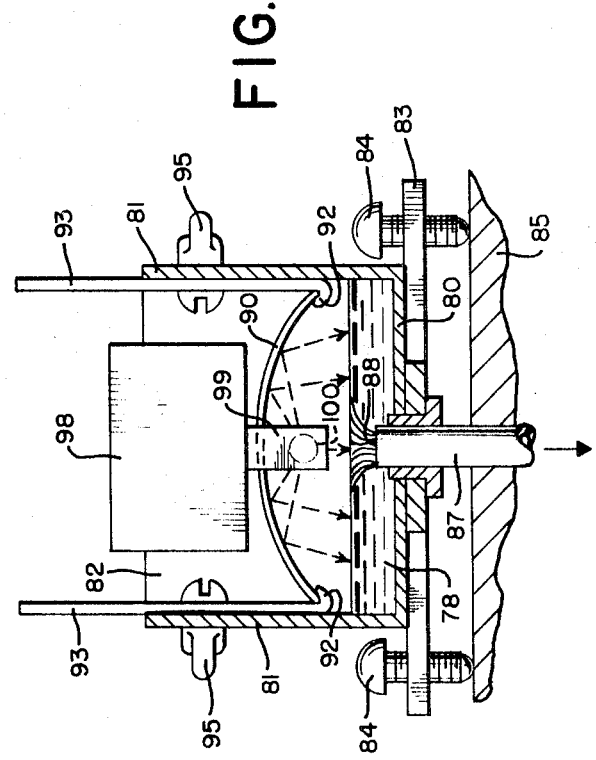
INVENTORS
EDMUND G. SMITH
JOHN W. HOOD

3,591,491
METHOD FOR THE TREATMENT OF AQUEOUS WASTES
Edmund G. Smith, 206 Watchung Ave., Upper Montclair, N.J. 07043, and John W. Hood, 43 John St., Ridgewood, N.J. 07450
Filed Oct. 4, 1968, Ser. No. 765,243
Int. Cl. C02c *1/06*
U.S. Cl. 210—6
12 Claims

ABSTRACT OF THE DISCLOSURE

The method of treating sewage or other biodegradable waste materials in a system including an aerobic process wherein a settleable sludge is formed which comprises returning a part or all of the sludge to a point in advance of the input of the aerobic process and subjecting a selected portion of the returned sludge to the action of ultra violet or other bacteriocidal rays for the biolysis of the bacteria in said portion, the portion being selected to meet the food requirements of the active aerobic bacteria in the aerobic process. The portion subjected to biolysis is so regulated that substantially all of the biodegradable matter is consumed and only a relatively small quantity of sludge is removed to end disposal.

---

This invention relates to an improved process and apparatus for the purification of aqueous wastes by biological oxidation, for the purpose of establishing and maintaining optimum efficiency and uniformity of treatment results, in order to produce the maximum abatement of pollution of receiving waters as a steady state condition, and to substantially reduce the mass of solids to be disposed of.

One object of this invention is to provide a scientific means of controlling a biological oxidation process.

Another object is to provide a new and useful apparatus affording greater process efficiency and economy of operation.

A further object is to provide a method and apparatus for the biological oxidation of aqueous wastes, so that the solid and liquid constituents will separate and compact readily as a steady state condition.

Another object of this invention is to materially reduce the scope, complexity and capital cost of the necessary plant facilities.

More specific objects and advantages will be apparent as the nature of this invention is more fully disclosed.

The wastes to which this invention is applicable include biodegradable wastes such as domestic sewage; paper mill white water; paper mill delignification liquors; food processing and canning; pharmaceuticals; tannery and leather finishing; distilleries; brewery and winery; packing house; abattoir; raw garbage and the like.

In accordance with this invention, scientific control of the Biological Oxidation Process is effected by means of the principles of Ecological classification of Microscopic Organisms and principles of Biophysics.

Process control problems are basically due to the necessity of producing a constant process efficiency from the numerous variables present in the inflow, such as for example: volume, strength, etc. The inventory of biological population must necessarily be adequate for maximum loading conditions when same occur. For the balance of time, an "underloaded condition" of varying degree exists which adversely affects process values, efficiency and control. For example, wide variations in the inflow are conducive to excessive growth of bacterial colonies resulting in the production of abnormal quantities of solids, accompanied by the undesirable reduction of particle density which precludes the necessary separation of solids and liquid, thereby creating hydraulic problems deleterious to process efficiency and greatly increasing the amount of excess solids deriving from the process. For example, heretofore, controlled application of chlorine to the process has been practiced to effect control of the particle density to be within practical operating limits as measured and determined by the "Sludge Volume Index" i.e. the volume in milliliters occupied by one gram of activated sludge after settling the aerated mixed liquor for 30 minutes—

$$SVI = \frac{\text{Percent settling by volume}}{\text{Percent suspended solids}}$$

Success and failure have attended this practice. It was found that toxic by-products from the application of chlorine adversely affected the purification process and impaired the results.

Collectively, the foregoing problems are basically due to the uncontrolled variations which occur in the mutual relation between the different microscopic organisms present in the biological population and their environment i.e., their Ecology.

Reference is made to the works of Kolkwitz and Marsson as contained in "Microscopy of Drinking Water," chapter 32; G. C. Whipple, John Wiley & Sons, N.Y. Their "Ecological System of Saprobic Organisms" provides us with detailed insight into microbial ecological classification and zones, which more fully explain the foregoing.

In the prior art, recognition of the various operating problems have necessarily resulted in the adoption of empirical process control means. For example, excessive bacterial growth resulting in increasing the mass of solids to be disposed of has been corrected by frequent removal of excess solids from the process. This has proven to be a serious physical and economic factor in the art of waste purification. On the other hand, failure to remove excess solids from the process as required, results in gross stream pollution caused by the involuntary loss of organic solids replete with micro organisms to the receiving waters.

We have discovered that by establishing and maintaining in the aerobic, activated sludge process, an Ecological Classification corresponding to the Mesosaprobic Zone according to Kolkwitz and Marsson, process uniformity and efficiency is obtained. Specifically, this is due to the presence of a heterogeneous microbial population composed of bacteria and ciliated protozoa. The latter are predominately holozoic and use as food the various complex materials which form the constituents of living organisms (bacteria) and discrete organic particles. The bacteria elaborate enzymes which enable them to remove soluble organic constituents from the aqueous wastes. Excessive bacterial growth causes a departure from this vital Ecological Classification Zone, thereby adversely affecting the growth and activities of the necessary holozoic protozoa resulting in the aforementioned process failure, and in excessive production of solids to be disposed of.

We have discovered that only by establishing and maintaining the aforesaid Ecological Classification that 90–95% process efficiency can be achieved as a steady state condition and the excess biodegradable solids resulting from the process are substantially reduced.

We have further discovered that control over the variations in the Ecological Classification could better be effected by Biophysical means such as the controlled application of radiant energy to effect biolysis to the degree and extent required, without the production of toxic by-products.

In one embodiment of our invention, radiant energy preferably in the form of ultra violet light, having a wavelength of from 1500 to 3000 angstrom units, preferably, having a wavelength of 1850 to 2537 angstrom units, is applied to a controlled portion of the microbial population which is then returned to the system to effect controlled biolysis. The correct ratio of food to organisms is thereby artificially maintained as a steady state condition, the protozoa readily assimilating the dead bacterial masses resulting from the biolysis and by means of their oxidative metabolic processes continuously converting this food to the ultimate end products of carbonaceous oxidation, namely carbon dioxide and water.

In accordance with this invention, a microbial biolyisis unit consisting of a source of radant energy is interjected into the return sludge circuit, in which a controlled portion of the sludge, after biolysis is returned to the system. This unit is capable of continuous, uninterrupted service or intermittent service by program control, responsive to process requirements. These process requirements may be ascertained by bench technique analyses or by more sophisticated continuous electronic control means.

The nature of the invention will be better understood by referring to the following descriptions, taken in connection with the accompanying drawings in which a specific embodiment has been set forth for purpose of illustration.

FIG. 1 is a diagrammatic view illustrating the invention as applied to a system for purifying aqueous wastes;

FIG. 2 is a side elevation of the radiant energy apparatus suitable for use in the system of FIG. 1;

FIG. 3 is a vertical section taken on the line 3—3 of FIG. 2 with parts in elevation.

Referring to the drawing more in detail the invention is shown as applied to a purification system for treating sewage, industrial waste or garbage in an aerobic process having a primary and a secondary clarifier and a return for selected portions of the activated sludge. FIG. 1 shows an input pipeline 1 for sewage or industrial waste feeding into a disintegrator 2 wherein the larger constituents are comminuted. A pipeline 5 having a valve 3 leads from the disintegrator to a sand and grit removal unit 9 the output of which is fed through pipeline 10 and valve 11 into influent well 17 of a primary clarifier 18.

Alternatively, raw garbage from hopper 64 is dropped onto trash separation conveyor 65 where glass, metal, trash and nonbiodegradables are removed manually. The conveyor 65 feeds the remainder into disintegrator 66 wherein the material is comminuted, the output of which is fed from output opening 75 to mixing tank 76, the output of which is fed through pipe 7 and valve 4 into the pipe 5 leading to the sand and grit removal unit 9. Water for dilution may be supplied through pipe 72, valve 71 and pipe 70 having regulating valve 73 into the feed hopper of disintegrator 66. Additional diluent may be supplied from pipe 70 through pipe 8 having valve 6 into pipe 5 in advance of the sand and grit removal unit 9. When required, nutrients may be fed through pipe 74 into mixing tank 76.

Primary sludge 19 is removed from the primary clarifier 18 through pipeline 20 to end disposal. The effluent 21 from the primary clarifier overflows into effluent launder 22, thence through pipe 24 having valve 23 to an aerobic process 29 of any desired type. The primary clarifier 18 may be bypassed through pipeline 14 having valve 13 and connecting pipe 10 with pipeline 24 which leads into the aerobic process.

The mixed liquor from the aerobic process containing the secondary solids is carried by pipeline 30 into input well 31 of final clarifier 32 wherein the separable solids are settled out to form a final sludge 33 and a purifier effluent 54. The purifier effluent 54 overflows into launder 55, thence through effluent pipeline 56 to sterilization unit 57 of any desired type, thence through pipeline 58 to detention chamber 59 from which it is fed through pipeline 60 to end disposal.

A portion of the effluent from pipeline 56 may be fed through pipe 67, pump 68 and regulating and shut off valve 69 to the pipe 70 for dilution purposes.

The final sludge 33 is removed from the final clarifier 32 through pipe 34 and pump 35, thence through pipe 37 and valve 36 to sludge reaeration chamber 61, thence through pipe 43 and valve 42 to pipe 41. The chamber 61 can be bypassed by pipe 39 and valve 38 interconnecting pipes 37 and 41. The pipe 41 connects through T 41a and pipe 45 having valve 44 to pipe 24 leading into the aerobic process. The pipe 45 also connects through pipe 48 having valve 47 to the microbial biolysis unit 49 to be described. The output of unit 49 is returned through pipe 50 having valve 53 to the pipe 45 beyond the valve 44. Alternatively, the output of the unit 49 may be fed from pipe 50 through pipe 52 and valve 51 to the input of pump 62, thence through pipe 63 to the input of the sludge reaeration chamber 61.

T 41a also connects through pipeline 61 having valve 15 into pipe 10 leading to the input of the primary clarifier 18. The final sludge may be removed to end disposal from pipe 41 through pipe 40 and valve 40a.

The biolysis control unit is shown in FIGS. 2 and 3 as comprising a tray 80 having side walls 81 and end walls 82 to receive and carry a layer of liquid for treatment, supported on strips 83 which extend across the bottom of the tray and carry adjusting screws 84 on each side of the tray. These screws 84 rest upon a base 85 to support the apparatus. An inlet pipe 86 and a discharge pipe 87 extend through the tray 80 at the two ends thereof. The outlet pipe 87 has upwardly extending flange 88 forming a weir over which the liquid flows and which determines the depth of the layer of liquid on the tray. The tray is preferably inclined slightly for the flow of liquid from the inlet to the outlet pipe.

A parabolic reflector 90 is disposed over the open top of the tray 80. This reflector rests on lips 92 of brackets 93 which are adjustably mounted on the side walls 81 of the tray by set screws 95 extending through slots 97 in the brackets. A housing 98 is mounted on the reflector 90 and has depending sockets 99 at its ends in which an ultraviolet fluorescent tube 100 is mounted. This tube is of the type radiating bacteriocidal rays in the 1500 to 3000 angstrom unit band is located in the focus of the reflector so that the rays are directed onto all parts of the liquid 78 in the tray.

In operation, the invention may be applied to an aerobic waste treatment process of the activated sludge type wherein the microbial biolysis control unit is used to control the microbial population in order to maintain optimum process performance and minimum production of solids to be disposed of.

When used for waste treatment, the process may or may not utilize primary separation and sludge reaeration. The influent waste may be of various origins e.g. domestic sewages; industrial waste, etc.

In FIG. 1, when it is desired to employ a process for treating sewage or industrial waste wherein a primary clarifier is used in conjunction with an aerobic process, a secondary separation chamber and a microbial biolysis unit, the untreated sewage or industrial waste enters the plant through influent pipeline 1, and thence through disintegrator 2 and valve 3, located in pipeline 5 in the open position, and valves 4 and 6 in pipelines 7 and 8 respectively in the closed position, flows through grit removal unit 9 and thence through pipeline 10 and with valve 11 in pipeline 10 in the open position and valve 13 in pipeline 14, in the closed position, and with regulating valve 15 in pipeline 16, in the open position enters influent well 17 of the primary clarifier 18. The settleable solid matter 19 accumulates at the bottom of the primary clarifier and is withdrawn through pipeline 20 to end disposal.

The separated liquid 21, overflows through effluent launder 22 and with shut off valve 23 in pipeline 24 in the open position, enters aerobic process 29 wherein a secondary sludge is produced. The mixed liquor from the aerobic process containing the secondary solids is carried by means of pipeline 30 to the influent well 31 of the final clarifier 32.

The settleable solid matter 33 accumulates at the bottom of the final clarifier 32 and is withdrawn through pipeline 34 and thence by means of pump 35 and with shut off valve 36 in pipeline 37 in the closed position and with shut off valve 38 in pipeline 39 in the open position and with shut off valve 40A in pipeline 40, in the closed position flows through pipe 41 and with shut off valve 42 in pipe 43, in closed position, and with regulating valve 44 in pipe 45 in the open position, the sludge reaeration chamber 61 is bypassed and a part of the sludge is returned to the influent of the aerobic process 29. The remainder of the sludge 33 passing through pipeline 45 is drawn off through regulating valve 47 in pipeline 48 and thence the microbial biolysis control unit 49 and thence through pipeline 50 and with shut off valve 51 mounted in pipe 52, in the closed position and with shut off valve 53 mounted in pipe 50 in the open position, recombines with the greater portion of the secondary sludge flowing through pipe 45.

The separated liquid 54 from the final clarifier 32, after sterilization goes to end disposal.

When the primary separation step is to be omitted, the influent flow passes through pipeline 10 and with shut off valves 11 and 23 in the closed position, and with shut off valve 13, mounted in pipeline 14 in the open position, passes through pipeline 24 directly into the aerobic process 29.

Where a sludge reaeration chamber is to be used, the sludge 33 is withdrawn from the final clarifier 32 through pipe 34, and thence by means of pump 35 passes through pipe 37 and with valve 36 in the open position and with shut off valve 38 in the closed position, enters the sludge reaeration chamber 61. With shut off valve 42 in pipe 43 in the open position, and with shut off valve 40A in pipe 40 in the closed position, the reaerated sludge passes through pipeline 41 and thence through pipe 45 to the aerobic process 29. A portion of the reaerated sludge flowing through pipe 45 may be drawn off through regulating valve 47 and passed through the microbial biolysis unit 49 and thence by means of pipe 50, and with shut off valve 53 in the closed position, and with shut off valve 51 in the open position, is returned to the influent of sludge reaeration chamber 61.

As required excess solids are removed from the process through pipe 16 to the influent of primary clarifier 18 where it is incorporated into the primary sludge 19. As required the sludge mixture is withdrawn through pipe 20 to end disposal. When the primary separation step is omitted, the excess solids are withdrawn through pipe 40 bearing valve 40a to end disposal.

When raw garbage is the subject to be treated, it enters the process through hopper 64 and thence to trash separation conveyor 65 and thence to disintegrator 66. For use as make up liquid, plant effluent may be supplied through line 70 by opening valve 69 and closing valve 71 or fresh water may be supplied by opening valve 71 and closing valve 69.

Raw sewage may also be used as a source of dilution water. As required nutrients may be introduced to the process through pipeline 74. The comminuted and diluted garbage leaves the disintegrator through exit opening 75 and then enters mixing tank 76 wherein thorough admixing of the nutrients and the waste material takes place. The effluent from the mixing tank 76 passes through regulating valve 4, and with shut off valve 3 in the closed position, enters grit removal unit 9.

By way of explanation, it should be understood that the aforementioned biological oxidation purification process, which is extensively employed in waste purification, is capable of optimum purification results:

(a) 90–95% biochemical oxygen demand removal
(b) 90–95% suspended solids removal
(c) maximum clarification of separated liquid
(d) optimum specific gravity of zoogleal matter formed in the process making said matter readily separable from the suspending liquid
(e) minimum amount of by-product solids concomitant with the foregoing maximum process values However, in practice, without the application of the invention described herein the Ecology necessary to establish and maintain these desirable end results is found lacking. This is due to an accelerated bacterial growth phase which results in a rapid increase in solids inventory. Because of the relatively dilute condition of these solids, having poor settling properties, the resulting large volumes of excess solids that must be wasted out of the system to maintain optimum process values, overload the disposal facilities. Inability to dispose of excess secondary solids or zoogleal matter formed as a result of this accelerated growth phase causes a rapid increase in the process solids inventory. This progressive inbalance between the organisms and the applied biochemical oxygen demand for food is one of the causes of "bulking," a progressive loss of settleability of the solid particles, which is accompanied by adverse changes in the type of organisms, resulting in complete overall failure of the treatment process. When this condition occurs, a continuous loss of organic solids to the receiving stream takes place, accompanied by gross aerial and stream pollution. This is found to be an irreversible condition, necessitating purging of the entire plant process solids inventory to waste and reestablishing the process with new organisms.

It is to be noted that the optimum process performance is the product of the establishment and maintenance of an optimum ratio of food to organisms or more specifically, the weight of biochemical oxygen demand applied, versus the weight of organisms or biologically active material undergoing aeration in the plant inventory. As a result, the foregoing values and conditions set forth in a, b, c, d and e, are not attained. Consequently, gross stream pollution is caused by loss of solids of low specific gravity being carried over in the effluent. Furthermore, a substantial increase in the excess sludge solids production in the secondary system simultaneously takes place. In turn, acute problems attend the disposal of the waste secondary sludge.

However, by employing the invention as shown in FIG. 1 in a process as described herein, accurately controlled amounts of radiant energy may be applied to the process. Means of control consists of a program timer in combination with apparatus as shown in FIGS. 2, 3 whereby regulation and control of the Ecological Classification is affected; optimum process values and conditions as set forth in (a), (b), (c), (d) and (e) are established and maintained. Gross aerial and stream pollution is prevented and the concomitant minimal excess biodegradable solids production eliminates the acute end disposal problems.

We find that various forms of radiant energy may be used to produce microbial biolysis. Likewise other means of effecting biolysis such as electrolysis, ultrasonics, heat, low temperature, photo chemistry, ozonation or other means which do not involve the production of toxic by-products inimical to the biological process, may be employed.

EXAMPLES

In the prior art, control of the Biological Oxidation Purification of aqueous wastes has relied exclusively upon frequent withdrawal of excess biologically active solids from the process in order to preserve process continuity.

Since no clearly defined insight into the fundamental underlying scientific considerations existed, process control relied exclusively on empiricism combined with the operator's experience on each individual installation.

The consequences of the foregoing can best be illustrated by a consideration of the record and data derived from extensive experience with said process. Reference is made to the following tabulation which for example discloses a production of excess biologically active solids per million gallons of waste purified, of 740 pounds dry solids.

Associated with this adverse physical and economic aspect in the art of waste purification, wide variations in aerial and stream pollution also occur.

Reference is made to the foregoing specifications which discloses in detail the underlying ecological considerations that are responsible for these undesirable variations.

We have discovered that the optimum ecological balance necessary to establish and maintain steady state conditions in the process, regardless of loading variations, etc., would best be achieved by means other than those employed in prior art.

We have found that optimum process conditions may be artificially established and maintained by the application of biophysical means. Microbial biolysis is effected by the application of radiant energy to a portion of the biological population withdrawn from the return sludge circuit and reintroduced to the inlet of the Biological Oxidation Process so as to maintain for all practical purposes, an optimum and constant relationship between the organic loading and the biological population present in the process inventory.

Excess biodegradable solids resulting from the process would be substantially reduced.

The following tabulation relates to a one million gallon per day domestic waste purification plant:

| Activated sludge | Conventional (without the invention) | Employing the invention |
|---|---|---|
| Volume of untreated sewage inflow, mg | 1 | 1 |
| Pounds excess biologically active sludge solids | ¹ 740 | 260—330 |
| Sludge volumes in gallons | 12,500 | 4,390—5,650 |

¹ Phelps, Vol. I, P.H.E.

What is claimed is:

1. The method of purifying aqueous waste material containing biodegadable organic matter in a system including an aerobic biological oxidation step wherein a mixed liquor is formed containing purified suspending liquid and biologically active solid matter suspended therein, which comprises separating a sludge containing said biologically active solid matter from said purified suspending liquid whereby said purified suspending liquid constitutes the effluent from the process, removing a portion of said sludge from said system, returning a second portion of said sludge containing biologically active solid matter to said system at a point in advance of said aerobic treatment step for further biological oxidation, separating a third portion of said sludge, effecting non-toxic microbial biolysis of said third portion for converting the same to biologically inactive material, returning said last material to said aerobic step to constitute food for the remaining active organisms and controlling the ratio between said portions so as to maintain a predetermined balance between the biodegradable organic matter which constitutes food for said process and the active organisms in said aerobic treatment step such that the inactivated organisms so returned are substantially consumed by the remaining active organisms with a corresponding reduction in sludge content.

2. The method as set forth in claim 1 in which the aqueous waste material comprises finely ground garbage and in which raw sewage in combination with nutrients is supplied to the garbage as a diluent.

3. The method as set forth in claim 2 in which the finely ground garbage, diluted with raw sewage, is supplied with return sludge from the aerobic process containing the nutrient elements required by the carbonaceous organisims for their synthesis.

4. The method as set forth in claim 2 in which purified suspending liquid in combination with nutrients is supplied to the garbage as a diluent.

5. The method set forth in claim 1 in which said aqueous waste material is passed through a primary clarifier prior to the introduction thereof into said aerobic process and in which a portion of the returned sludge is introduced into the aqueous material in advance of the primary clarifier.

6. The method as set forth in claim 1 where a portion of the returned sludge is passed through a sludge reaeration step prior to being returned to said system.

7. The method as set forth in claim 1 in which the aqueous waste material comprises sewage.

8. The method as set forth in claim 1 in which the aqueous waste comprises an industrial waste product.

9. The method as set forth in claim 1 in which radiant energy means is employed to effect microbial biolysis.

10. The method as set forth in claim 1 in which said third portion is subjected to the action of radiant energy in the 1500 to 3000 angstrom unit band.

11. The method as set forth in claim 1 in which said third portion is passed in the form of a thin layer, through a treating zone wherein it is subjected to radiant energy rays.

12. The method set forth in claim 11 in which said rays are in the 1800 to 2537 angstrom unit band.

References Cited

UNITED STATES PATENTS

| 2,477,815 | 8/1949 | Mallory | 210—6 |
| 3,459,303 | 8/1969 | Bradley | 210—195 |

OTHER REFERENCES

Keefer, C. E.: "Sewage Treatment Works," McGraw-Hill, 1st edition, 1940, TD 741K3, pp. 354 and 394–400.

JAMES L. DECESARE, Primary Examiner

U.S. Cl. X.R.

210—7, 64, 195